(12) United States Patent
Tsuji

(10) Patent No.: US 11,354,552 B2
(45) Date of Patent: Jun. 7, 2022

(54) SERVER, NON-TRANSITORY COMPUTER-READABLE RECORDING MEDIUM STORING COMPUTER-READABLE INSTRUCTIONS FOR SERVER, AND METHOD EXECUTED BY SERVER

(71) Applicant: BROTHER KOGYO KABUSHIKI KAISHA, Nagoya (JP)

(72) Inventor: Kazuki Tsuji, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/089,830

(22) Filed: Nov. 5, 2020

(65) Prior Publication Data
US 2021/0142131 A1    May 13, 2021

(30) Foreign Application Priority Data
Nov. 8, 2019  (JP) .............................. JP2019-203322

(51) Int. Cl.
*G06K 15/00* (2006.01)
*G06F 9/54* (2006.01)
*G06F 16/955* (2019.01)

(52) U.S. Cl.
CPC ......... *G06K 15/4075* (2013.01); *G06F 9/542* (2013.01); *G06F 16/9566* (2019.01); *G06K 15/002* (2013.01)

(58) Field of Classification Search
CPC ...... G06F 3/121; G06F 3/1235; G06F 3/1288; G06F 16/9566; G06F 9/542; G06K 15/002; G06K 15/4075; G06Q 10/0875
See application file for complete search history.

(56) References Cited

U.S. PATENT DOCUMENTS

| | | | | |
|---|---|---|---|---|
| 7,584,273 B2 * | 9/2009 | Shibata | ................ | G06Q 10/087 709/206 |
| 2016/0288515 A1 * | 10/2016 | Matsuda | ............ | G06K 15/4075 |
| 2016/0292629 A1 | 10/2016 | Matsuda | | |
| 2016/0292774 A1 * | 10/2016 | Ohara | ................... | G06F 3/1287 |
| 2017/0301006 A1 | 10/2017 | Matsuda | | |

FOREIGN PATENT DOCUMENTS

| | | |
|---|---|---|
| JP | 2004-013750 A | 1/2004 |
| JP | 2016-194770 A | 11/2016 |

* cited by examiner

*Primary Examiner* — Iriana Cruz
(74) *Attorney, Agent, or Firm* — Scully, Scott, Murphy & Presser, PC

(57) ABSTRACT

The server may receive consumable article information including usage information from an external device and determine by using the usage information included in the consumable article information whether a first notification condition is satisfied. In a case where it is determined that the first notification condition is satisfied, the server may send by using a first communication method a first notification for prompting an order of a new consumable article to external. After the first notification has been sent to external, the server may determine whether a second notification condition is satisfied. In a case where it is determined that the second notification condition is satisfied, the server may send by using a second communication method a second notification for prompting the order of the new consumable article to external.

20 Claims, 11 Drawing Sheets

(Continuation of FIG. 3)

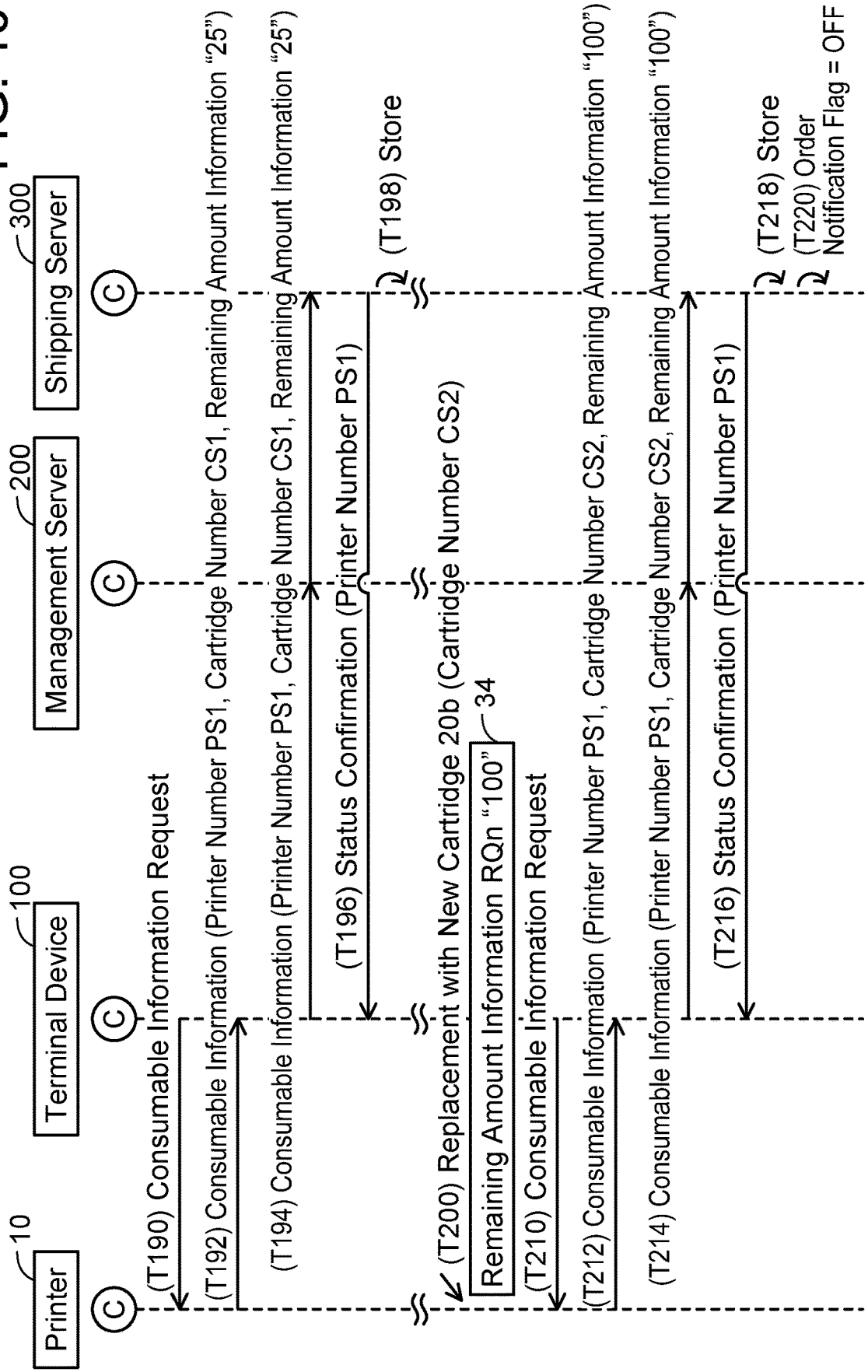

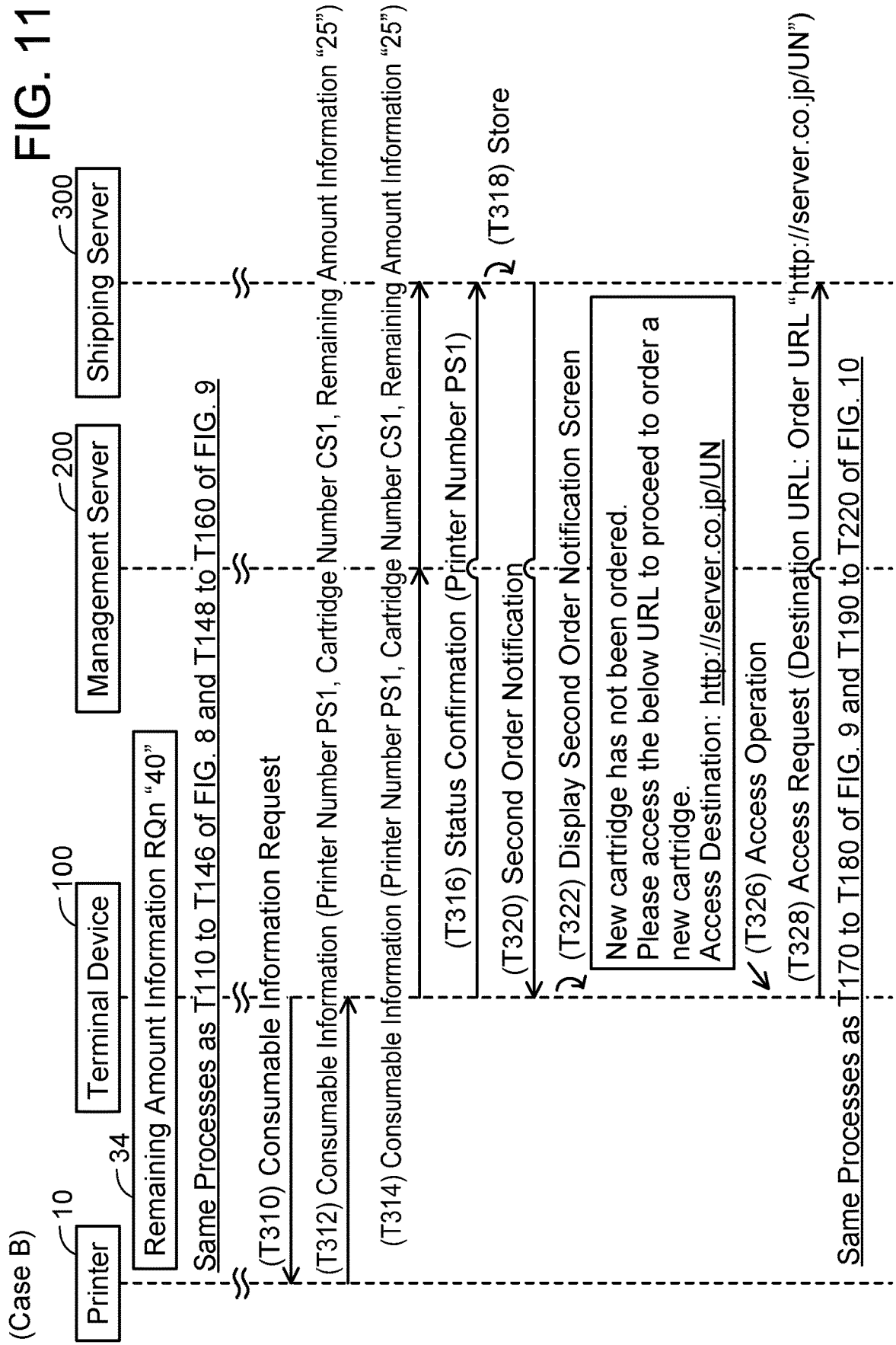

SERVER, NON-TRANSITORY COMPUTER-READABLE RECORDING MEDIUM STORING COMPUTER-READABLE INSTRUCTIONS FOR SERVER, AND METHOD EXECUTED BY SERVER

CROSS-REFERENCE TO RELATED APPLICATION

This application claims priority to Japanese Patent Application No. 2019-203322, filed on Nov. 8, 2019, the entire contents of which are hereby incorporated by reference into the present application.

TECHNICAL FIELD

The art disclosed herein relates to a server configured to externally send a notification for prompting an order of a new consumable article for a printer.

BACKGROUND ART

An order assisting system for consumable articles, which is provided with a printer, a user terminal, a server, an inventory management terminal, and a distribution center terminal, is known. When a remaining amount of a consumable article in the printer becomes small, the printer sends information indicating that the remaining amount of the consumable article has become small to the server through the user terminal. When receiving this information from the user terminal, the server sends information including a device name of the printer and the like to the inventory management terminal. When receiving this information from the server, the inventory management terminal updates a consumable article stock quantity stored in the inventory management terminal. Then, the inventory management terminal sends a warning e-mail to the user terminal when the consumable article stock quantity becomes equal to or less than a warning stock quantity. As such, the user can access an order website notified in the warning e-mail to order a consumable article.

SUMMARY

A new consumable article may not be ordered due to a reason that the user has not read the warning e-mail, for example. In such case, consumable article(s) possessed by the user may become insufficient.

The disclosure herein provides art for suppressing insufficiency in consumable article(s) possessed by a user.

A server disclosed herein may comprise a controller configured to: receive consumable article information including usage information from an external device, the usage information being information related to a current used amount of a consumable article that is currently attached to a printer for printing; in a case where the consumable article information is received from the external device, determine by using the usage information included in the consumable article information whether a first notification condition is satisfied, the first notification condition being related to an order of a new consumable article; in a case where it is determined that the first notification condition is satisfied, send by using a first communication method a first notification for prompting the order of the new consumable article to external; after the first notification has been sent to external, determine whether a second notification condition is satisfied, the second notification condition corresponding to that the new consumable article has not been ordered in response to the sending of the first notification; and in a case where it is determined that the second notification condition is satisfied, send by using a second communication method that is different from the first communication method a second notification for prompting the order of the new consumable article to external.

A control method, a computer program, and a computer-readable recording medium storing the computer program for realizing the aforementioned server are also novel and useful. Further, a communication system that comprises the aforementioned server and the external device is also novel and useful.

BRIEF DESCRIPTION OF THE DRAWINGS

FIG. 10 shows continuation of FIG. 9.
FIG. 11 shows a sequence diagram of Case B in which an order is made in response to a second order notification.

EMBODIMENTS

Figure 1:
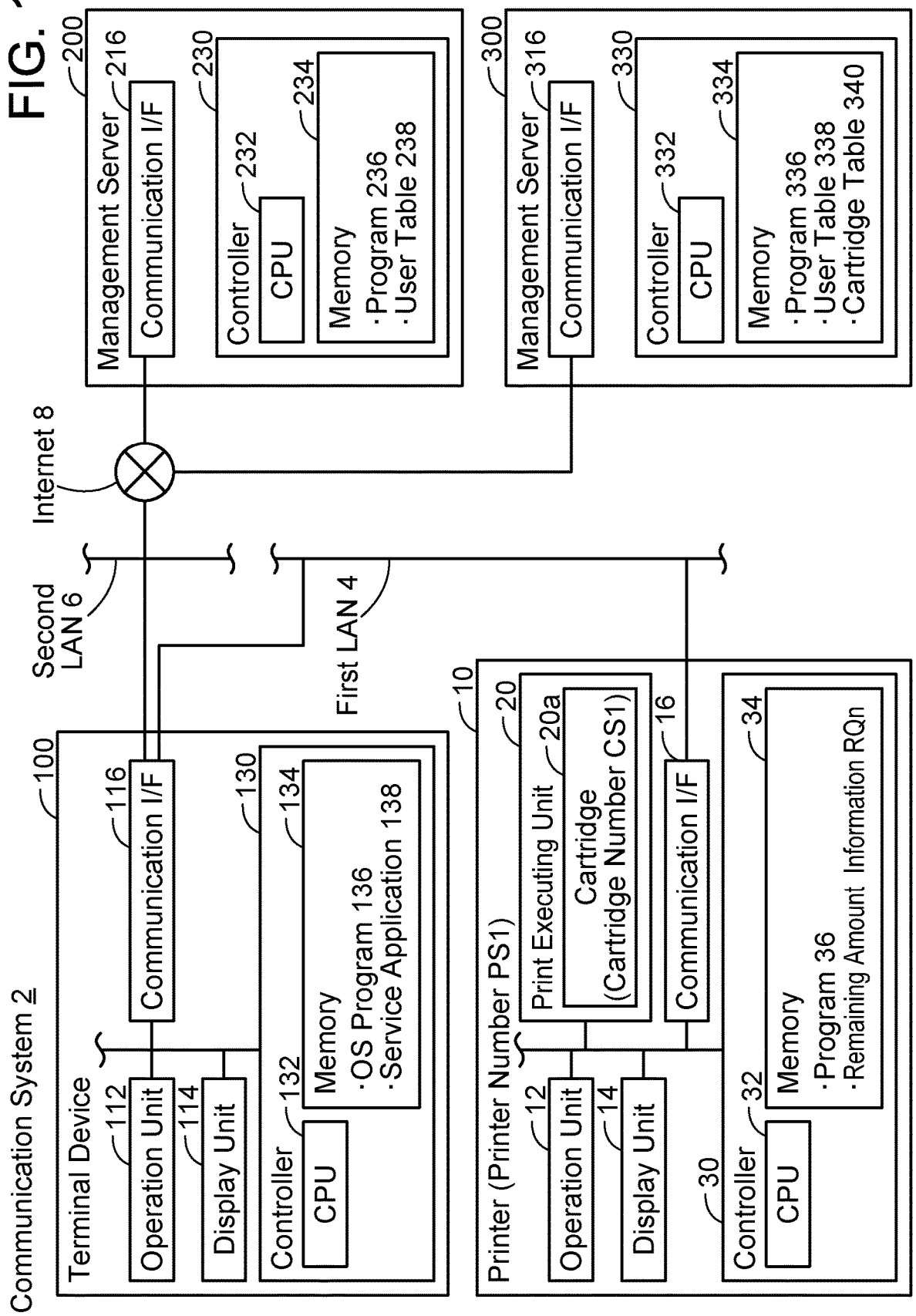
FIG. 1 shows a configuration of a communication system.

First Embodiment (Configuration of Communication System 2; FIG. 1)
As shown in FIG. 1, a communication system 2 includes a printer 10, a terminal device 100, a management server 200, and a shipping server 300. The printer 10 and the terminal device 100 are connected to a first Local Area Network (LAN) 4. The first LAN 4 is not connected to the Internet 8. The printer 10 and the terminal device 100 are capable of communicating with each other through the first LAN 4. The terminal device 100 is connected to a second LAN 6. The second LAN 6 is connected to the Internet 8. The management server 200 and the shipping server 300 are connected to the Internet 8. The management server 200 and the shipping server 300 are servers configured to provide a shipping service of shipping cartridges to a user of the printer 10.

(Configuration of Printer 10)
The printer 10 is a peripheral device (e.g., a peripheral device of a PC, etc.) configured to execute a print function. The printer 10 may be a printer configured to execute printing on paper or may be a printer configured to execute printing on clothing. Further, the printer 10 may be a multi-function peripheral configured to execute a scan function, a FAX function, and/or the like in addition to the print function. The printer 10 includes an operation unit 12, a display unit 14, a communication interface (hereinbelow, an interface will be denoted "I/F") 16, a print executing unit 20, and a controller 30. A printer number PS1 is assigned to the printer 10. Printer numbers are unique character strings assigned, when a plurality of printers is manufactured, to the printers respectively.

The operation unit 12 includes a plurality of keys. The user can input various instructions to the printer 10 by operating the operation unit 12. The display unit 14 is a display for displaying various types of information. The communication I/F 16 is connected to the first LAN 4. The communication I/F 16 is not connected to the Internet 8. The communication I/F 16 may be a wireless I/F or a wired I/F.

The print executing unit 20 is an inkjet print mechanism A cartridge 20a storing ink therein is attached to the print executing unit 20. The print executing unit 20 is configured to execute printing by using the ink in the cartridge 20a. A cartridge number CS1 is assigned to the cartridge 20a. Cartridge numbers are unique character strings assigned, when a plurality of cartridges is manufactured, to the cartridges respectively.

The controller 30 includes a CPU 32 and a memory 34. The CPU 32 is configured to execute various processes in accordance with a program 36 stored in the memory 34. The memory 34 is constituted of a volatile memory, a non-volatile memory, and the like. The memory 34 stores remaining amount information RQn. The remaining amount information RQn indicates a current remaining amount in the cartridge 20a attached to the print executing unit 20. When the print function is executed, the CPU 32 calculates a used amount of the ink in the cartridge 20a and subtracts the calculated used amount from the remaining amount information RQn to update the remaining amount information RQn. Further, when a new cartridge is attached to the print executing unit 20, the CPU 32 updates the remaining amount information RQn to "100".

(Configuration of Terminal Device 100)

The terminal device 100 is a portable device such as a cellphone, a smartphone, a PDA, a portable music player, or a portable video player. The terminal device 100 includes an operation unit 112, a display unit 114, a communication I/F 116, and a controller 130.

The operation unit 112 includes a plurality of keys. The user can input various instructions to the terminal device 100 by operating the operation unit 112. The display unit 114 is a display for displaying various types of information. The display unit 114 functions also as a so-called touch panel (i.e., an operation unit). The communication I/F 116 is connected to the first LAN 4 and the second LAN 6. The communication I/F 116 is connected to the Internet 8 via the second LAN 6.

The controller 130 includes a CPU 132 and a memory 134. The CPU 132 is configured to execute various processes in accordance with an Operating System (OS) program 136 stored in the memory 134. The OS program 136 is a program for controlling basic operations of the terminal device 100. Further, the memory 134 stores a service application 138. The service application 138 is an application used to receive the shipping service provided by the management server 200 and the shipping server 300. The service application 138 is installed, for example, from a server on the Internet to the terminal device 100.

(Configuration of Management Server 200)

The management server 200 is provided on the Internet 8 by a vendor of the printer 10. In a variant, the management server 200 may be provided on the Internet 8 by a business entity different from the vendor.

The management server 200 includes a communication I/F 216 and a controller 230. The communication I/F 216 is connected to the Internet 8. The controller 230 includes a CPU 232 and a memory 234. The CPU 232 is configured to execute various processes in accordance with a program 236 stored in the memory 234. The memory 234 is constituted of a volatile memory, a non-volatile memory, and the like. The memory 234 further stores a user table 238.

(Configuration of Shipping Server 300)

The shipping server 300 is provided on the Internet 8 by the vendor of the printer 10. In a variant, the shipping server 300 may be provided on the Internet 8 by a business entity different from the vendor.

The shipping server 300 includes a communication I/F 316 and a controller 330. The communication I/F 316 is connected to the Internet 8. The controller 330 includes a CPU 332 and a memory 334. The CPU 332 is configured to execute various processes in accordance with a program 336 stored in the memory 334. The memory 334 is constituted of a volatile memory, a non-volatile memory, and the like. The memory 334 further stores a user table 338 and a cartridge table 340.

Figure 2:
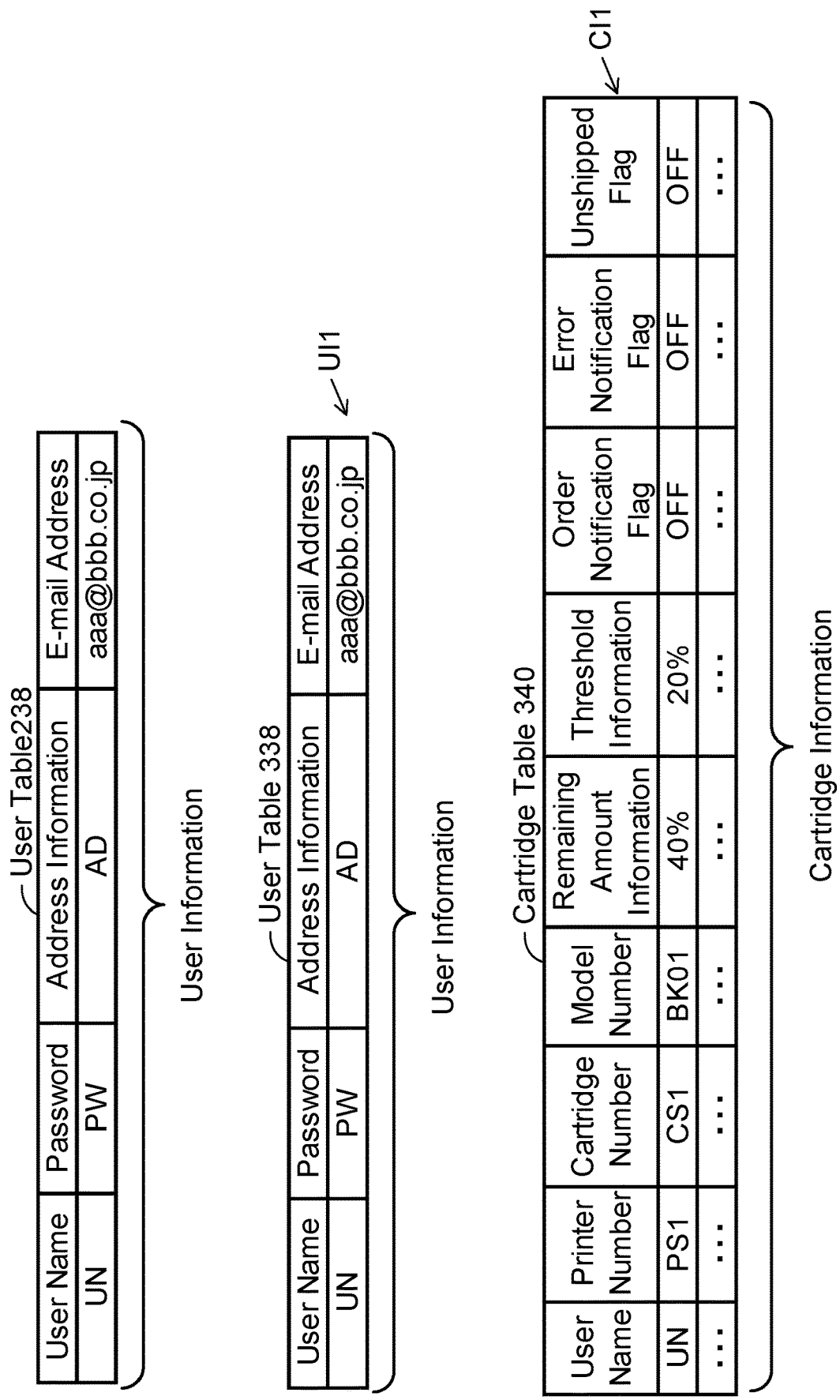
FIG. 2 shows tables.

(Configurations of Respective Tables; FIG. 2)

Next, contents of the table 238 in the management server 200 and the tables 338 and 340 in the shipping server 300 will be described with reference to FIG. 2.

The user table 238 in the management server 200 stores one or more pieces of user information. Each piece of user information includes a user name (e.g., UN) for identifying a user, a password (e.g., PW), address information (e.g., AD) indicating an address of the user, and an e-mail address (e.g., "aaa@bbb.co.jp") of the user.

The user table 338 in the shipping server 300 stores the same user information as the user table 238 in the management server 200.

The cartridge table 340 stores one or more pieces of cartridge information. Each piece of cartridge information includes a user name (e.g., UN), a printer number (e.g., PS1), a cartridge number (e.g., CS1), a model number (e.g., "BK01") of the cartridge identified by the cartridge number, remaining amount information indicating the remaining amount of the cartridge, threshold information, an order notification flag, an error notification flag, and an unshipped flag. The threshold information is information for determining whether to send or not a first order notification that is a notification for prompting an order of a new cartridge. The order notification flag indicates one of "ON" that indicates the first order notification has been sent and "OFF" that indicates the first order notification has not been sent yet. The error notification flag indicates one of "ON" that indicates an error notification, which indicates that the cartridge currently attached to the printer is a product not covered by the shipping service, has been sent and "OFF" that indicates the error notification has not been sent yet. The unshipped flag indicates one of "ON" that indicates a new consumable article has not been ordered in response to the first order notification having been sent and the new consumable article has not been shipped and "OFF" that indicates the new consumable article has been shipped.

Figure 3:
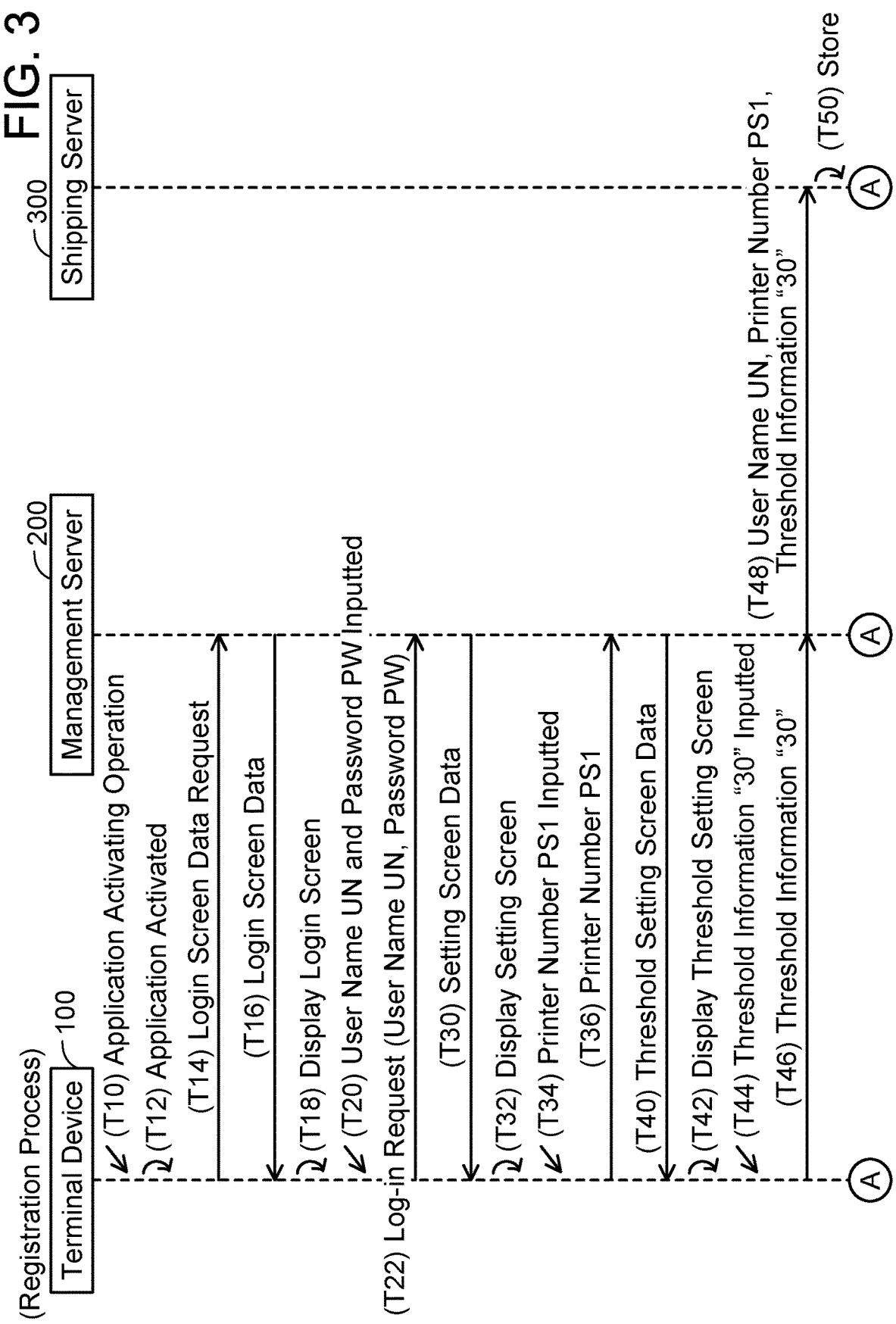
FIG. 3 shows a sequence diagram of a registration process.
Figure 4:
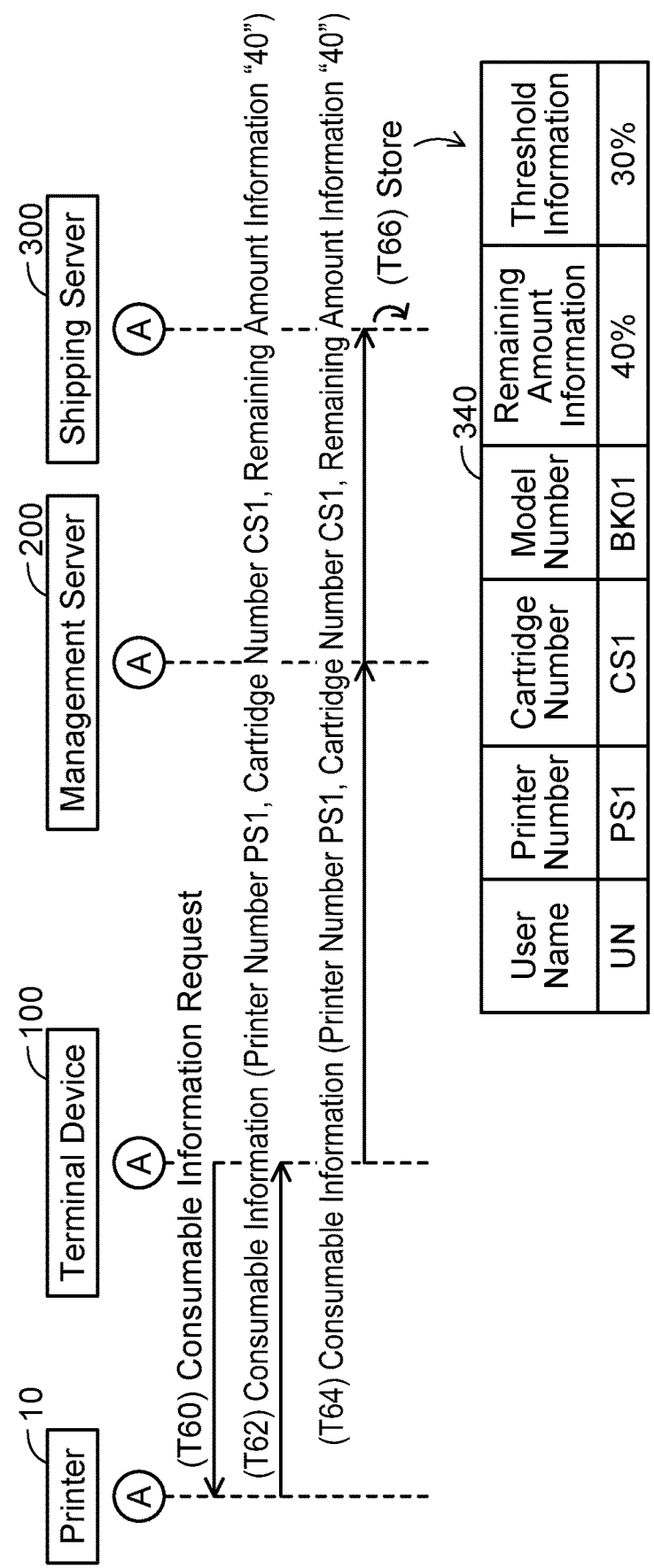
FIG. 4 shows continuation of FIG. 3.

(Registration Process; FIGS. 3 and 4)

Next, a registration process will be described with reference to FIGS. 3 and 4. The registration process is a process executed to enable the user of the printer 10 to receive the shipping service. Specifically, the registration process is a process of registering cartridge information in the cartridge table 340 of the shipping server 300. Hereinbelow, in order to facilitate understanding, processes executed by the CPUs of the respective devices (such as the CPU 32 of the printer 10) may be described with the respective devices (such as the printer 10) as the subject of action, instead of describing the CPUs as the subject of action. Further, every communication described below between the printer 10, the terminal device 100, the management server 200, and the shipping server 300 is executed via the communication I/F 16 of the printer 10, the communication I/F 116 of the terminal device 100, the communication I/F 216 of the management server 200, and the communication I/F 316 of the shipping server 300. As such, hereinbelow, a phrase "via the communication I/F 16 (116, 216, or 316)" will be omitted.

In an initial state of FIG. 3, the user table 238 of the management server 200 and the user table 338 of the shipping server 300 have already stored user information UI1 that includes a user name UN, a password PW, address information AD, and an e-mail address "aaa@bbb.co.jp". This user information is stored in the management server 200 and the shipping server 300 by the user using the terminal device 100, for example. Further, in the initial state of FIG. 3, the service application 138 has already been installed in the terminal device 100.

When accepting an operation for activating the service application 138 from the user in T10, the terminal device 100 activates the service application 138 in T12 and sends a login screen data request to the management server 200 in T14.

When receiving the login screen data request from the terminal device 100 in T14, the management server 200 sends login screen data to the terminal device 100 in T16.

When receiving the login screen data from the management server 200 in T16, the terminal device 100 displays a login screen on the display unit 114 in T18. Then, when accepting an operation of inputting the user name UN and the password PW from the user in T20, the terminal device 100 sends a login request including the user name UN and the password PW to the management server 200 in T22.

When receiving the login request from the terminal device 100 in T22, the management server 200 determines that authentication is successful because the combination of the user name UN and the password PW included in the login request is in the user table 238. In this case, the management server 200 sends setting screen data to the terminal device 100 in T30.

When receiving the setting screen data from the management server 200 in T30, the terminal device 100 displays a setting screen on the display unit 114 in T32. The setting screen is a screen for inputting the printer number of a printer that is a target of the shipping service. When accepting an operation of inputting the printer number PS1 from the user in T34, the terminal device 100 sends the printer number PS1 to the management server 200 in T36.

When receiving the printer number PS1 from the terminal device 100 in T36, the management server 200 sends threshold setting screen data to the terminal device 100 in T40.

When receiving the threshold setting screen data from the management server 200 in T40, the terminal device 100 displays a threshold setting screen on the display unit 114 in T42. The threshold setting screen is a screen for allowing the user to input threshold information. When accepting an operation of inputting threshold information "30" from the user in T44, the terminal device 100 sends the threshold information "30" to the management server 200 in T46.

When receiving the threshold information "30" from the terminal device 100 in T46, the management server 200 identifies the logged in user name UN, and sends to the shipping server 300 in T48 the identified user name UN, the printer number PS1 received in T36, and the threshold information "30" received in T46.

When receiving the user name UN, the printer number PS1, and the threshold information "30" from the management server 200 in T48, the shipping server 300 associates the user name UN, the printer number PS1, and the threshold information "30" with each other and stores the same in the cartridge table 340 in T50.

In T60 of FIG. 4, the terminal device 100 sends a consumable article information request to the printer 10 to which the printer number PS1 inputted in T34 is assigned. The consumable article information request is a command for requesting a printer that received the request to send consumable article information including its printer number, the cartridge number of a cartridge currently attached to the printer, and the remaining amount information of the cartridge.

When receiving the consumable article information request from the terminal device 100 in T60, the printer 10 identifies the cartridge number CS1 of the cartridge 20a currently attached to the printer 10 and the remaining amount information RQn in the memory 34. Then, in T62, the printer 10 sends to the terminal device 100 consumable article information including the printer number PS1, the cartridge number CS1, and the remaining amount information "40".

When receiving the consumable article information from the printer 10 in T62, the terminal device 100 sends the consumable article information to the shipping server 300 via the management server 200 in T64. As aforementioned, the communication I/F 16 of the printer 10 is not connected to the Internet 8. That is, the printer 10 cannot send the consumable article information to the management server 200 via the Internet 8. In the present embodiment, the terminal device 100 receives the consumable article information from the printer 10 and sends this consumable article information to the management server 200. As such, the management server 200 can receive the consumable article information even though the printer 10 cannot access the Internet 8. As a result, the user of the printer 10 can receive the shipping service provided by the management server 200 and the shipping server 300.

When receiving the consumable article information from the management server 200 in T64, the shipping server 300 identifies the printer number PS1 in the consumable article information. Then, in T66, the shipping server 300 stores, in the cartridge table 340, the cartridge number CS1 in the consumable article information, a model number "BK01" of the cartridge that can be attached to the printer 10 identified by the cartridge number CS1, and the remaining amount information "40" in the consumable article information in association with the printer number PS1 in the cartridge table 340 (see T50 of FIG. 5). At this time, the order notification flag, the error notification flag, and the unshipped flag associated with the printer number PS1 in the cartridge table 340 are all set in "OFF". As a result, cartridge information CI1 (see FIG. 2) is registered in the cartridge table 340. After this, the terminal device 100 sends the consumable article information request to the printer 10 every first predetermined time (e.g., every 12 hours) and sends the consumable article information received from the printer 10 to the shipping server 300 via the management server 200.

Figure 5:
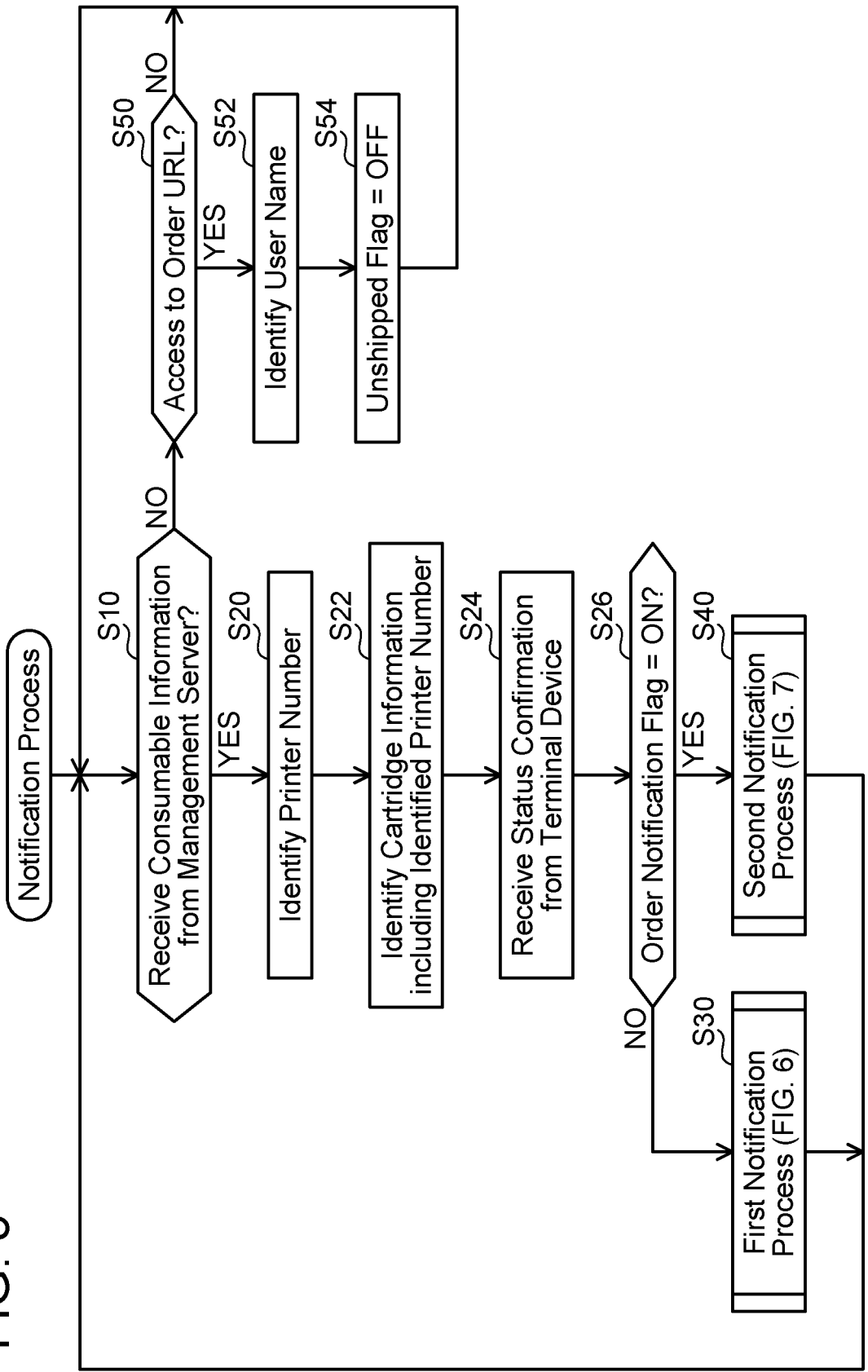
FIG. 5 shows a flowchart of a notification process executed by a server.

(Notification Process; FIG. 5)

Next, contents of a notification process executed by the CPU 332 of the shipping server 300 will be described with reference to FIG. 5. The notification process is executed after the registration process of FIGS. 3 and 4 is completed, that is, after one or more pieces of cartridge information have been registered in the cartridge table 340.

In S10, the CPU 332 monitors whether consumable article information has been received from the management server 200. In a case where consumable article information has been received from the management server 200, the CPU 332 determines YES in S10 and proceeds to S20.

In S20, the CPU 332 identifies the printer number included in the consumable article information received in S10.

In S22, the CPU 332 identifies cartridge information including the printer number identified in S20 (hereinbelow termed "target cartridge information") in the cartridge table 340.

In S24, the CPU 332 receives a status confirmation from the terminal device 100. The status confirmation is a command for confirming whether or not a new consumable article has been ordered in response to the first order notification having been sent.

In S26, the CPU 332 determines whether the order notification flag in the target cartridge information is "ON" or not. The CPU 332 proceeds to S30 in a case of determining that the order notification flag is "OFF" (NO in S26). On the other hand, the CPU 332 proceeds to S40 in a case of determining that the order notification flag is "ON" (YES in S26).

Figure 6:
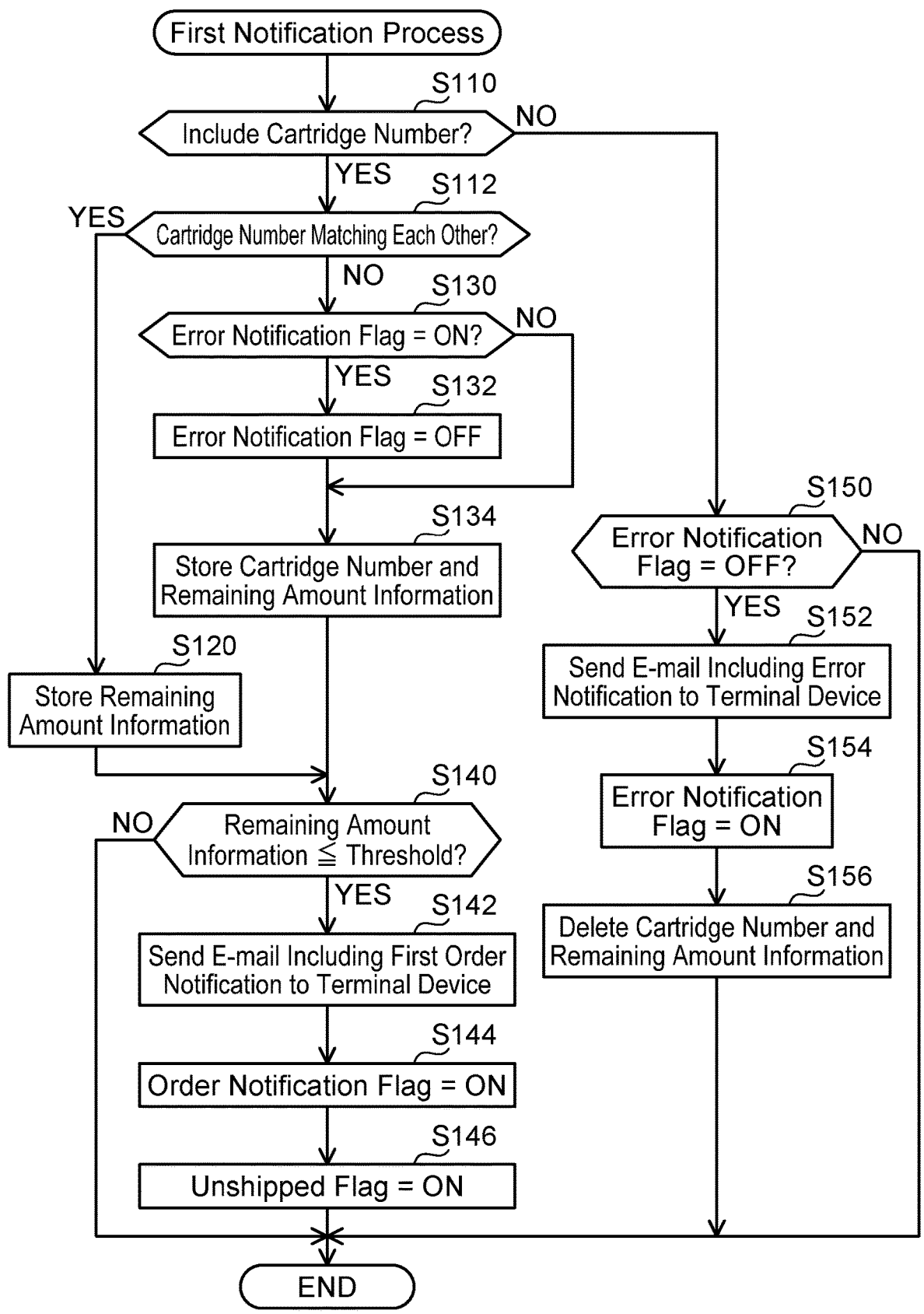
FIG. 6 shows a flowchart of a first notification process executed by the server.

In S30, the CPU 332 executes a first notification process (see FIG. 6). The first notification process is a process for sending the first order notification by e-mail. The CPU 332 returns to S10 when S30 is completed.

Figure 7:
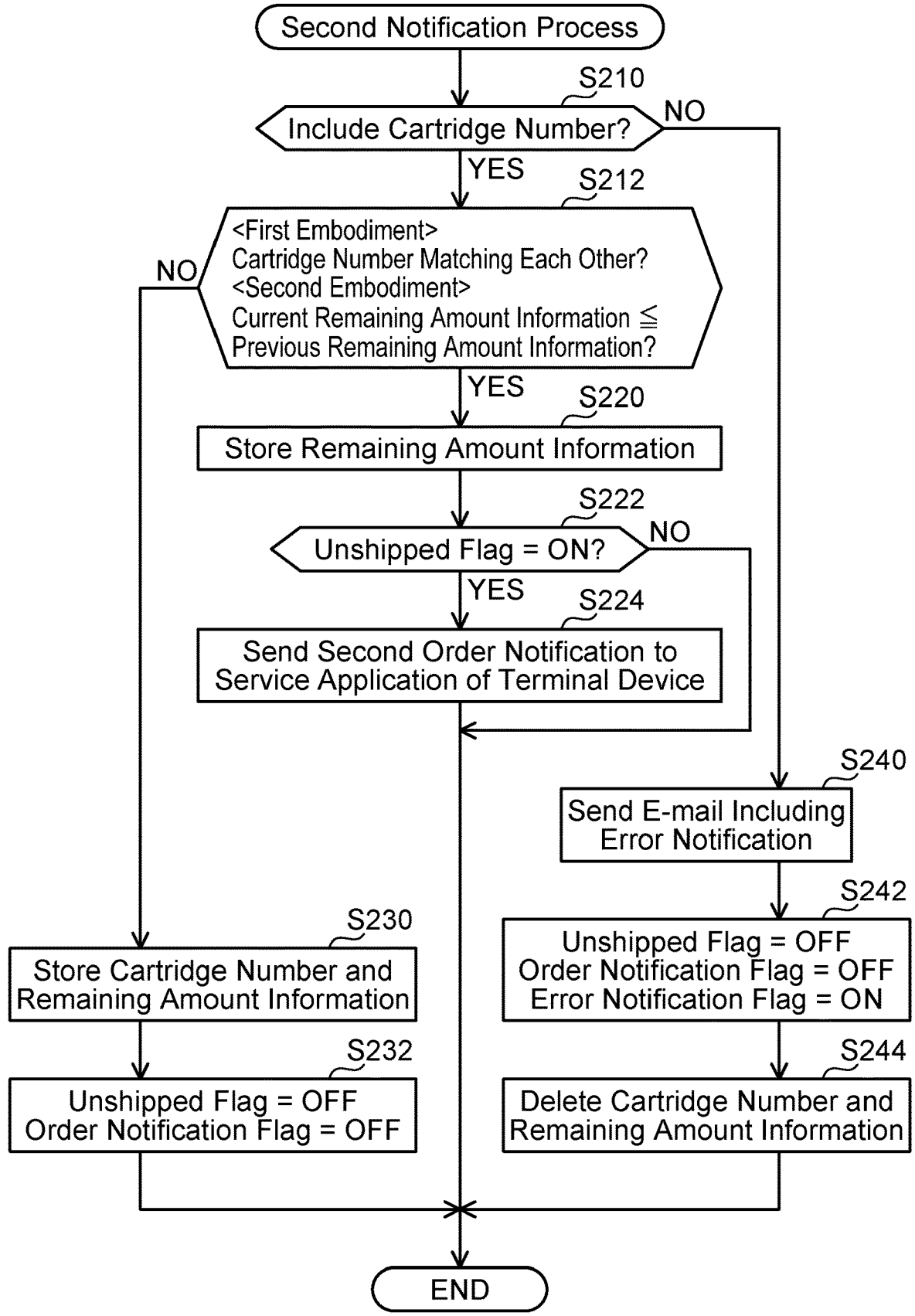
FIG. 7 shows a flowchart of a second notification process executed by the server.

In S40, the CPU 332 executes a second notification process (see FIG. 7). The second notification process is a process for sending, to the service application 138 of the terminal device 100, a second order notification which is a notification for prompting an order of a new cartridge. The second notification process is executed after the first order notification has been sent in the first notification process. The CPU 332 returns to S10 when S40 is completed.

Figure 9:
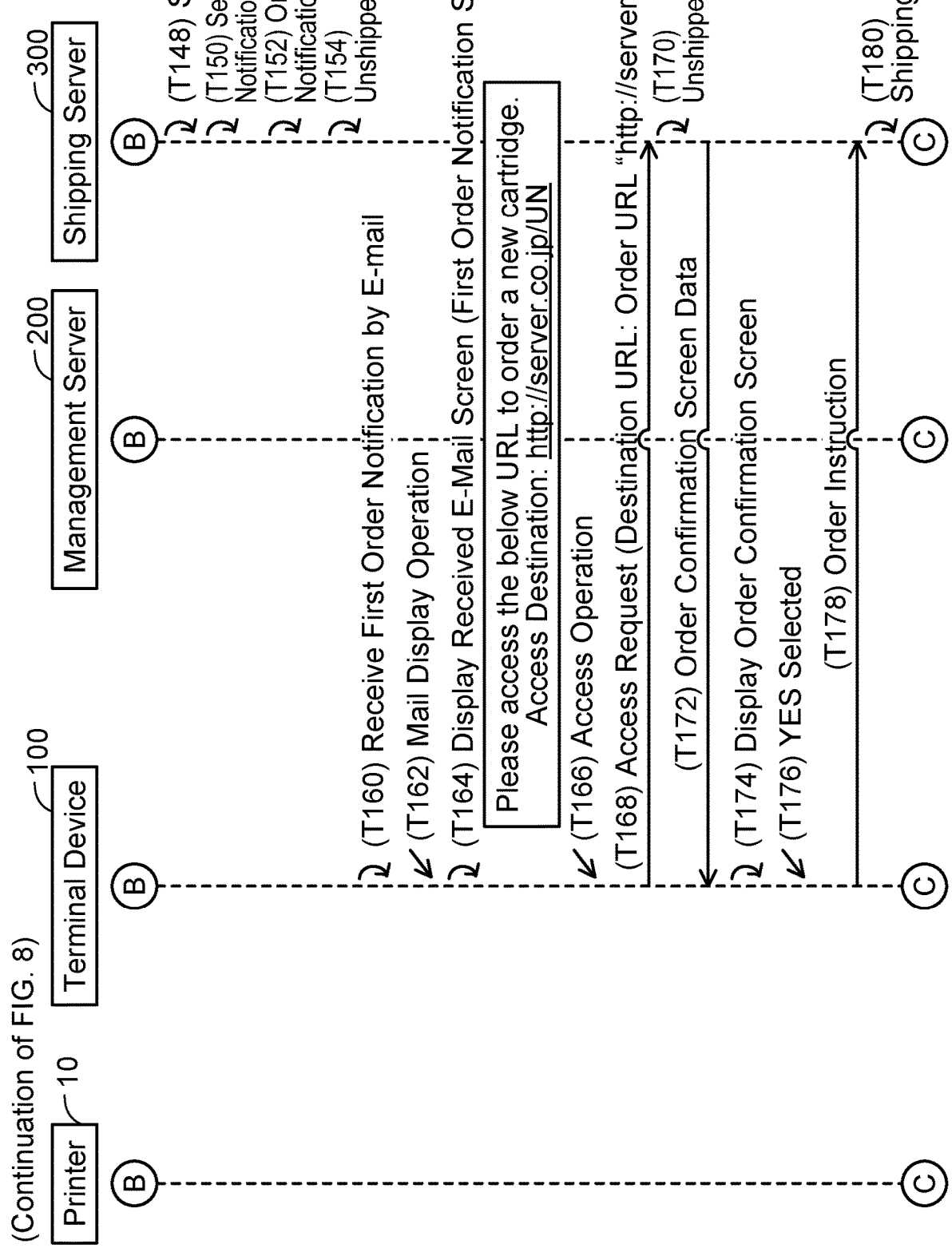
FIG. 9 shows continuation of FIG. 8.

Simultaneously with the monitoring of S10, the CPU 332 determines in S50 whether an order URL has been accessed. The order URL is a URL that is described in the first order notification and the second order notification and is to be accessed to order a new cartridge. As shown in FIG. 9, the order URL includes a character string (a user name in the present embodiment) for identifying a user who has accessed the order URL. In a case where the order URL has been accessed, the CPU 332 determines YES in S50 and proceeds to S52.

In S52, the CPU 332 identifies the user name included in the order URL.

In S54, the CPU 332 changes the unshipped flag associated with the user name identified in S52 from "ON" to "OFF" in the cartridge table 340. The CPU 332 returns to S10 when S54 is completed.

(First Notification Process; FIG. 6)

Next, the first notification process executed in S30 of FIG. 5 will be described with reference to FIG. 6. In S110, the CPU 332 determines whether the consumable article information received in S10 includes a cartridge number. The CPU 332 proceeds to S112 in a case of determining that the received consumable article information includes a cartridge number (YES in S110). On the other hand, the CPU 332 proceeds to S150 in a case of determining that the received consumable article information does not include a cartridge number (NO in S110). A case in which the consumable article information does not include a cartridge number may be a case in which the cartridge currently attached to the printer 10 is a cartridge not covered by the shipping service and the printer 10 thus cannot obtain the cartridge number of this cartridge.

In S112, the CPU 332 determines whether the cartridge number in the consumable article information received in S10 matches the cartridge number in the target cartridge information. The CPU 332 proceeds to S120 in a case of determining that the cartridge number in the consumable article information matches the cartridge number in the target cartridge information (YES in S112). On the other hand, the CPU 332 proceeds to S130 in a case of determining that the cartridge number in the consumable article information does not match the cartridge number in the target cartridge information (NO in S112).

In S120, the CPU 332 stores the remaining amount information in the consumable article information received in S10 as the remaining amount information of the target cartridge information.

In S130, the CPU 332 determines whether the error notification flag in the target cartridge information is "ON" or not. The CPU 332 proceeds to S132 in a case of determining that the error notification flag is "ON" (YES in S130). On the other hand, the CPU 332 skips S132 and proceeds to S134 in a case of determining that the error notification flag is "OFF" (NO in S130).

In S132, the CPU 332 changes the error notification flag in the target cartridge information from "ON" to "OFF".

In S134, the CPU 332 stores the cartridge number and the remaining amount information in the consumable article information received in S10 as the cartridge number and the remaining amount information of the target cartridge information.

In S140, the CPU 332 determines whether the remaining amount indicated by the remaining amount information in the consumable article information received in S10 is no greater than a threshold indicated by the threshold information in the target cartridge information. The CPU 332 proceeds to S142 in a case of determining that the remaining amount is equal to or less than the threshold (YES in S140). On the other hand, the CPU 332 terminates the process of FIG. 6 in a case of determining that the remaining amount is greater than the threshold (NO in S140).

In S142, the CPU 332 sends an e-mail including the first order notification to the terminal device 100. Specifically, the CPU 332 firstly identifies the user name in the target cartridge information and then identifies the e-mail address associated with the identified user name in the user table 338. Then, the CPU 332 sends an e-mail including the first order notification to the identified e-mail address. As described, the e-mail is sent to the terminal device 100 which is capable of receiving e-mails addressed to the identified e-mail address.

In S144, the CPU 332 changes the order notification flag in the target cartridge information from "OFF" to "ON".

In S146, the CPU 332 changes the unshipped flag in the target cartridge information from "OFF" to "ON". When S146 is completed, the CPU 332 terminates the process of FIG. 6.

In the case of determining NO in S110, the CPU 332 determines in S150 whether the error notification flag in the target cartridge information is "OFF" or not. The CPU 332 proceeds to S152 in a case of determining that the error notification flag is "OFF" (YES in S150). On the other hand, the CPU 332 terminates the process of FIG. 6 in a case of determining that the error notification flag is "ON" (NO in S150).

In S152, similar to S142, the CPU 332 uses the target cartridge information and the user table 338 to identify the e-mail address to which an e-mail is to be sent and then sends an e-mail including the error notification to the identified e-mail address. This error notification includes a message indicating that the cartridge currently attached to the printer 10 is not covered by the shipping service. As such, the user of the printer 10 can acknowledge that the shipping service is not available currently.

In S154, the CPU 332 changes the error notification flag in the target cartridge information from "OFF" to "ON".

In S156, the CPU 332 deletes the cartridge number and the remaining amount information in the target cartridge information. When S156 is completed, the CPU 332 terminates the process of FIG. 6.

(Second Notification Process; FIG. 7)

Next, the second notification process executed in S40 of FIG. 5 will be described with reference to FIG. 7. S210 is similar to S110 of FIG. 6. The CPU 332 proceeds to S212 in a case of determining YES in S210. In S212, the CPU 332 determines whether the cartridge number in the target cartridge information matches the cartridge number in the consumable article information received in S10. The CPU 332 proceeds to S220 in a case of determining that the cartridge number in the target cartridge information matches the cartridge number in the received consumable article information (YES in S212). On the other hand, the CPU 332 proceeds to S230 in a case of determining that the cartridge number in the target cartridge information does not match the cartridge number in the received consumable article information (NO in S212).

S220 is similar to S120 in FIG. 6. In S222, the CPU 332 determines whether the unshipped flag in the target cartridge information is "ON" or not. The CPU 332 proceeds to S224 in a case of determining that the unshipped flag is "ON" (YES in S222). On the other hand, the CPU 332 skips S224 and terminates the process of FIG. 7 in a case of determining that the unshipped flag is "OFF" (NO in S222).

In S224, the CPU 332 sends the second order notification to the terminal device 100 using communication in which the service application 138 installed in the terminal device 100 is designated as a destination. In the present embodiment, in S24 of FIG. 5, the CPU 332 receives, from the terminal device 100 (more specifically, from the service application 138), the status confirmation as an HTTP request using communication according to Hypertext Transfer Protocol (HTTP). The CPU 332 can send the second order notification to the terminal device 100 (more specifically, to the service application 138) by sending the second order notification as an HTTP response to that HTTP request. A URL for accessing the shipping server 300 is described in the second order notification, similar to the first order notification. Further, the second order notification is sent in a case where the shipping server 300 has not been accessed despite the first order notification having been sent. As above, the CPU 332 sends the second order notification to the terminal device 100 in the case where the unshipped flag is "ON". The case in which the unshipped flag is "ON" may be a case in which the shipping server 300 has not been accessed despite the first order notification having been sent, that is, a case in which a new cartridge has not been ordered despite the first order notification having been sent. As such, the CPU 332 can suitably determine whether a new cartridge has been ordered in response to the first order notification having been sent to the terminal device 100.

S230 is similar to S134. In S232, the CPU 332 changes the unshipped flag in the target cartridge information from "ON" to "OFF" in the case where the unshipped flag is "ON" and changes the order notification flag in the target cartridge information from "ON" to "OFF" in the case where the order notification flag is "ON". When S232 is completed, the CPU 332 terminates the process of FIG. 7. As described, the CPU 332 can send the second order notification to the terminal device 100 only in the case of determining that the cartridge number in the target cartridge information matches the cartridge number in the consumable article information. In the case where the cartridge number in the target cartridge information matches the cartridge number in the consumable article information, it is highly likely that a new cartridge has not been ordered after the first order notification was sent. As such, sending the second order notification to the terminal device 100 can suppress insufficiency in cartridge(s) possessed by the user.

The CPU 332 proceeds to S240 in the case of determining NO in S210. S240 is similar to S152 in FIG. 6. In S242, the CPU 332 changes the unshipped flag in the target cartridge information from "ON" to "OFF" in the case where the unshipped flag is "ON", and changes the order notification flag in the target cartridge information from "ON" to "OFF" in the case where the order notification flag is "ON". In S242, the CPU 332 further changes the error notification flag in the target cartridge information from "OFF" to "ON". S244 is similar to S156 in FIG. 6. When S244 is completed, the CPU 332 terminates the process of FIG. 7.

(Specific Cases; FIGS. 8 to 11)

Next, specific cases realized by the processes of FIGS. 5 to 7 will be described with reference to FIGS. 8 to 11.

Figure 8:
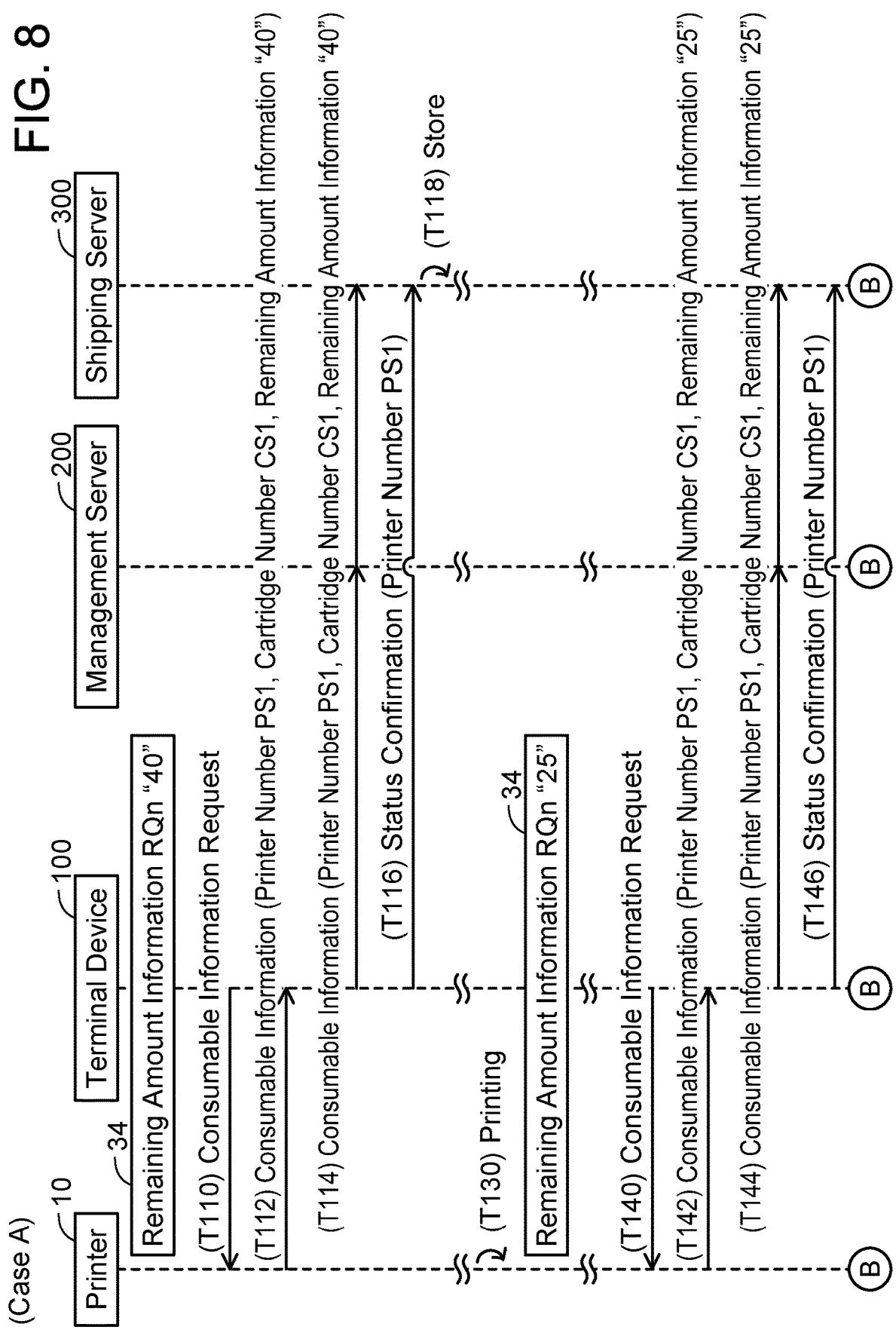
FIG. 8 shows a sequence diagram of Case A in which an order is made in response to a first order notification.

(Case A; FIGS. 8 to 10)

In Case A, a new cartridge is ordered in response to the first order notification having been sent from the shipping server 300 to the terminal device 100. Case A will be described with reference to FIGS. 8 to 10. An initial state of Case A is a state after the registration process of FIGS. 3 and 4 has been completed. As such, the remaining amount information RQn "40" is in the memory 34 of the printer 10. Further, the cartridge information CI1 corresponding to the user name UN (printer number PS1, cartridge number CS1, model number "BK01", remaining amount information "40", threshold information "20", order notification flag "OFF", error notification flag "OFF", and unshipped flag "OFF") is in the cartridge table 340 of the shipping server 300 (see FIG. 2).

When determining that the first predetermined time has elapsed since the consumable article information request was sent to the printer 10, the terminal device 100 sends the consumable article information request to the printer 10 in T110. T112 and T114 are respectively similar to T62 and T64 in FIG. 4. After having sent the consumable article information in T114, the terminal device 100 sends a status confirmation including the printer number PS1 to the shipping server 300 in T116.

When receiving the consumable article information from the management server 200 in T114 (YES in S10 of FIG. 5), the shipping server 300 identifies the printer number PS1 in the consumable article information (S20) and identifies the cartridge information CI1 including the printer number PS1 in the cartridge table 340 (S22). Then, when receiving the status confirmation from the terminal device 100 in T116 (S24), the shipping server 300 determines that the order notification flag in the cartridge information CI1 is "OFF" (NO in S26). Then, the shipping server 300 determines that the consumable article information received in T114 includes the cartridge number CS1 (YES in S110 of FIG. 6), determines that the cartridge number CS1 in the received consumable article information matches the cartridge number CS1 in the cartridge information CI1 (YES in S112), and stores the remaining amount information "40" in the received consumable article information as the remaining amount information of the cartridge information CI1 in T118 (S120). Next, the shipping server 300 determines that the remaining amount "40" indicated by the remaining amount information in the received consumable article information is greater than the threshold "30" indicated by the threshold information in the cartridge information CI1 (NO in S140).

The present case assumes a situation in which printing is executed in the printer 10 before the first predetermined time elapses from the time when the terminal device 100 sent the consumable article information request to the printer 10 in T110. When printing is executed using the cartridge 20a in T130, the printer 10 calculates a used amount "15" of the ink in the cartridge 20a and subtracts the calculated used amount "15" from the remaining amount "40" indicated by the remaining amount information RQn to update the remaining amount indicated by the remaining amount information RQn to "25".

After this, when determining that the first predetermined time has elapsed since the consumable article information request was sent in T110 to the printer 10, the terminal device 100 sends the consumable article information request to the printer 10 in T140. T140 to T146 are similar to T110 to T116 respectively, except that the remaining amount information in the consumable article information is different. When receiving the status confirmation from the terminal device 100 in T146 (S24), the shipping server 300 determines that the order notification flag in the cartridge information CI1 is "OFF" (NO in S26), determines that the consumable article information received in T144 includes the cartridge number CS1 (YES in S110 of FIG. 6), determines that the cartridge number CS1 in the received consumable article information matches the cartridge number CS1 in the cartridge information CI1 (YES in S112), and stores the remaining amount information "25" in the received consumable article information as the remaining amount information of the cartridge information CI1 in T148 of FIG. 9 (S120). Then, the shipping server 300 determines that the remaining amount "25" indicated by the remaining amount information in the received consumable article information is equal to or less than the threshold "30" indicated by the threshold information in the cartridge information CI1 (YES in S140), identifies the user name UN in the cartridge information CI1, and identifies the e-mail address "aaa@bbb.co.jp" associated with the user name UN in the user table 338. Next, the shipping server 300 sends an e-mail including the first order notification to the e-mail address "aaa@bbb.co.jp" in T150 (S142), changes the order notification flag in the cartridge information CI1 from "OFF" to "ON" in T152 (S144), and changes the unshipped flag in the cartridge information CI1 from "OFF" to "ON" in T154 (S146).

In T160, the terminal device 100 receives the e-mail from the shipping server 300. When accepting an operation for displaying the e-mail received from the shipping server 300 from the user in T162, the terminal device 100 displays a received e-mail screen based on the first order notification (first order notification screen) on the display unit 114 in T164. This screen includes a message for prompting an order of a new cartridge and an order URL "http://server-.co.jp/UN" to be accessed to order a new cartridge. Then, when accepting an operation for accessing the order URL "http://server.co.jp/UN" from the user in T166, the terminal device 100 sends to the shipping server 300 in T168 an access request including the order URL "http://server.co.jp/UN" as a destination URL.

When receiving the access request from the terminal device 100 in T168 (YES in S50 of FIG. 5), the shipping server 300 identifies a character string "UN" included in the destination URL in the access request (S52) and identifies the cartridge information CI1 including the character string "UN" in the cartridge table 340. Then, the shipping server 300 changes the unshipped flag in the cartridge information CI1 from "ON" to "OFF" in T170 and sends order confirmation screen data to the terminal device 100 in T172.

When receiving the order confirmation screen data from the shipping server 300 in T172, the terminal device 100 displays an order confirmation screen on the display unit 114 in T174. The order confirmation screen is a screen for allowing the user to select whether a shipping process for shipping a new cartridge should be executed or not. When accepting selection of "YES" in the order confirmation screen from the user in T176, the terminal device 100 sends an order instruction to the shipping server 300 in T178.

When receiving the order instruction from the terminal device 100 in T178, the shipping server 300 determines that the shipping process should be executed and executes the shipping process in T180. The shipping server 300 firstly identifies the user information UI1 including the character string "UN" in the user table 338. Then, the shipping server 300 identifies the address information AD in the user information UI1 and executes a process for shipping a new cartridge 20b to the address indicated by the identified address information AD. As a result, the cartridge 20b is delivered to the user of the printer 10. A cartridge number CS2 is assigned to the cartridge 20b.

After this, when determining that the first predetermined time has elapsed since the consumable article information request was sent to the printer 10 in T140, the terminal device 100 sends the consumable article information request to the printer 10 in T190 of FIG. 10. T190 to T196 are respectively similar to T140 to T146 of FIG. 8. When receiving the status confirmation from the terminal device 100 in T196 (S24), the shipping server 300 determines that the order notification flag in the cartridge information CI1 is "ON" (YES in S26), determines that the consumable article information received in T194 includes the cartridge number CS1 (YES in S210 of FIG. 7), determines that the cartridge number CS1 in the received consumable article information matches the cartridge number CS1 in the cartridge information CI1 (YES in S212), and stores the remaining amount information "25" in the received consumable article information as the remaining amount information of the cartridge information CI1 in T198 (S220). Then, the shipping server 300 determines that the unshipped flag in the cartridge information CI1 is "OFF" (NO in S222).

After this, in T200, the cartridge 20a attached to the printer 10 is replaced with the cartridge 20b by the user of the printer 10. When the cartridge 20b is attached, the printer 10 updates the remaining amount information RQn in the memory 34 to "100".

After this, when determining that the first predetermined time has elapsed since the consumable article information request was sent to the printer 10 in T190, the terminal device 100 sends the consumable article information request to the printer 10 in T210. T210 to T216 are similar to T140 to T146 in FIG. 8 respectively, except that the cartridge number and the remaining amount information in the consumable article information are different. When receiving the status confirmation from the terminal device 100 in T216

(S24), the shipping server 300 determines that the order notification flag in the cartridge information CI1 is "ON" (YES in S26), determines that the consumable article information received in T214 includes the cartridge number CS2 (YES in S210 of FIG. 7), and determines that the cartridge number CS2 in the received consumable article information does not match the cartridge number CS1 in the cartridge information CI1 (NO in S212). In this case, in T218, the shipping server 300 stores the cartridge number CS2 and the remaining amount information "100" in the received consumable article information as the cartridge number and the remaining amount information of the cartridge information CI1 (S230). Then, in T220, the shipping server 300 changes the order notification flag in the cartridge information CI1 from "ON" to "OFF" (S232).

(Case B; FIG. 11)

Next, Case B will be described with reference to FIG. 11. In Case B, a new cartridge is not ordered in response to the first order notification having been sent to the terminal device 100 from the shipping server 300. An initial state of Case B is similar to that of Case A.

Firstly, processes similar to T110 to T146 of FIG. 8 and T148 to T160 of FIG. 9 are executed between the printer 10, the terminal device 100, the management server 200, and the shipping server 300. In the present case, a new cartridge is not ordered in response to the first order notification having been sent to the terminal device 100 because the user of the terminal device 100 has not noticed that the terminal device 100 received the first order notification by e-mail.

When determining that the first predetermined time has elapsed since the consumable article information request was sent to the printer 10 in T140, the terminal device 100 sends the consumable article information request to the printer 10 in T310. T310 to T316 are respectively similar to T140 to T146. When receiving the status confirmation from the terminal device 100 in T316 (S24 of FIG. 5), the shipping server 300 determines that the order notification flag in the cartridge information CI1 is "ON" (YES in S26), determines that the consumable article information received in T314 includes the cartridge number CS1 (YES in S210 of FIG. 7), and determines that the cartridge number CS1 in the received consumable article information matches the cartridge number CS1 in the cartridge information CI1 (YES in S212). In this case, in T318, the shipping server 300 stores the remaining amount information "25" in the received consumable article information as the remaining amount information of the cartridge information CI1 (S220). Next, the shipping server 300 determines that the unshipped flag in the cartridge information CI1 is "ON" (YES in S222) and sends the second order notification to the terminal device 100 in T320. Specifically, the shipping server 300 sends the second order notification to the service application 138 installed in the terminal device 100 (S224). As above, the shipping server 300 sends the second order notification when the order URL is not accessed despite the first predetermined time (12 hours) having elapsed since the first order notification was sent.

When receiving the second order notification from the shipping server 300 in T320, the terminal device 100 displays a second order notification screen on the display unit 114 in T322. The second order notification screen includes a message indicating that a new cartridge has not yet been ordered, a message prompting an order of a new cartridge, and the order URL "http://server.co.jp/UN" to be accessed to order a new cartridge. When accepting an operation for accessing the order URL "http://server.co.jp/UN" from the user in T326, the terminal device 100 sends to the shipping server 300 in T328 an access request including the order URL "http://server.co.jp/UN" as the destination URL. After this, processes similar to T170 to T180 of FIG. 9 are executed, as a result of which the new cartridge 20b is shipped to the user of the printer 10. Then, processes similar to T190 to T198 of FIG. 10 are executed until the user attaches the cartridge 20b to the printer 10. When the cartridge 20a attached to the printer 10 is replaced with the cartridge 20b by the user of the printer 10 (see T200 of FIG. 10), processes similar to T210 to T220 are executed.

(Effect of Present Embodiment)

Even though an e-mail including the first order notification is sent from the shipping server 300 to the terminal device 100, the user may not notice that the terminal device 100 received the e-mail, thus a new cartridge may not be ordered in response to the first order notification. Considerations may be given to a configuration in which an e-mail including the first order notification is sent to the terminal device 100 again if a new cartridge is not ordered in response to the first order notification after the previous e-mail including the first order notification has been sent to the terminal device 100, however, considering that the user did not notice the receipt of the previous e-mail including the first order notification, there is a high possibility that the user do not notice the receipt of the subsequent e-mail including the first order notification. In view of this, in the present embodiment, in the case of receiving the consumable article information including the remaining amount information from the terminal device 100 via the management server 200 (YES in S10 of FIG. 5), the shipping server 300 uses the remaining amount information included in the consumable article information to determine whether the remaining amount is no greater than the threshold (S140 of FIG. 6). In the case of determining that the remaining amount is equal to or less than the threshold (YES in S140), the shipping server 300 sends the first order notification to the terminal device 100 by e-mail (S142). Then, the shipping server 300 determines whether the unshipped flag, which indicates that a new cartridge has not been ordered yet in response to the sending of the first order notification to the terminal device 100, is "ON" or not (S222 of FIG. 7) after having sent the first order notification to the terminal device 100, and in the case of determining that the unshipped flag is "ON" (YES in S222), the shipping server 300 sends the second order notification to the terminal device 100 (S224) by using the communication in which the service application 138 installed in the terminal device 100 is identified as the destination. Since the communication method for sending the first order notification to the terminal device 100 and the communication method for sending the second order notification to the terminal device 100 are different, the user of the printer 10 can notice the second order notification even though he/she could not notice the first order notification. Thus, the user can order a new cartridge in response to the second order notification even though he/she could not notice the first order notification. Thus, insufficiency in the cartridge(s) possessed by the user can be suppressed.

(Corresponding Relationships)

The management server 200 and the shipping server 300 are examples of "server". The terminal device 100 is an example of "external device". The remaining amount information is an example of "usage information". The cartridges 20a an 20b are examples of "consumable article". The first order notification, the second order notification, and the error notification are respectively examples of "first notification", "second notification", and "third notification". The communication by e-mail and the communication between the shipping server 300 and the service application installed in the terminal device 100 are respectively examples of "first communication method" and "second communication method". The order URL is an example of "URL to be accessed for ordering the new consumable article". The cartridge number is an example of "identification information". The consumable article information including the cartridge number is an example of "consumable article information includes predetermined information related to a vendor of the printer".

S10 of FIG. 5 is an example of "receive consumable article information". S140 and S142 of FIG. 6 are respectively examples of "determine whether a first notification condition" and "send a first notification". S222 and S224 of FIG. 7 are respectively examples of "determine whether a second notification condition" and "send a second notification".

Second Embodiment

Next, a second embodiment will be described. In this embodiment, the process executed in S212 of FIG. 7 is different from that of the first embodiment.

In the present embodiment, in S212, the CPU 332 determines whether a current remaining amount, which is the remaining amount indicated by the remaining amount information in the consumable article information received in S10 of FIG. 5, is no greater than a previous remaining amount, which is the remaining amount indicated by the remaining amount information in the target cartridge information. The CPU 332 proceeds to S220 in a case of determining that the current remaining amount is equal to or less than the previous remaining amount (YES in S212). On the other hand, the CPU 332 proceeds to S230 in a case of determining that the current remaining amount is greater than the previous remaining amount (NO in S212).

The CPU 332 sends the second order notification to the terminal device 100 in the case of determining that the current remaining amount is equal to or less than the previous remaining amount (YES in S212) and determining that the unshipped flag is "ON" (YES in S220). According to such a configuration, whether the cartridge attached to the printer 10 was replaced or not after the first order notification was sent can surely be determined. As such, sending of the second order notification to the terminal device 100 after the cartridge attached to the printer 10 was replaced by the user can be avoided.

(First Variant) The "server" may be a server in which the management server 200 and the shipping server 300 are configured integrally.

(Second Variant) The printer 10 may be an example of the "external device". In this variant, the communication I/F 16 of the printer 10 may be connected to the Internet 8.

(Third Variant) The "consumable article" is not limited to the cartridge, but may be print paper. In this variant, the shipping server 300 receives consumable article information that includes information indicating the number of print paper used in printing from the terminal device 100. In this variant, the information indicating the number of print paper used in printing is an example of the "usage information".

(Fourth Variant) The "second notification condition" is not limited to the order URL not being accessed before the first predetermined time elapses from the time when the first order notification was sent. For example, examples of the "second notification condition" may include the shipping server 300 not receiving the order instruction from the terminal device 100 before the first predetermined time elapses from the time when the first order notification was sent, or the shipping server 300 not executing the shipping process before the first predetermined time elapses from the time when the first order notification was sent. Further, in another variant, the CPU 332 may store how many times the determination of YES has been made in S222 of FIG. 7, and may execute, after S222, the process of S224 in a case where the number of times of the determination of YES in S222 reaches a predetermined number of times, while it may skip S224 and terminate the process of FIG. 7 in a case where the number of times of the determination of YES in S222 is less than the predetermined number of times. In this variant, the order URL not being accessed in a time period from the sending of the first order notification to when the number of times of the determination of YES in S222 exceeds the predetermined number of times is an example of the "second notification condition". Further, in another variant, the CPU 332 may determine, after S222, whether a time having elapsed since the first order notification was sent exceeds a second predetermined time or not, and may execute the process of S224 in a case where the elapsed time exceeds the second predetermined time, while it may skip S224 and terminate the process of FIG. 7 in a case where the elapsed time is less than the second predetermined time. The second predetermined time may be different from the first predetermined time and may, for example, be 24 hours or 36 hours. In this variant, the order URL not being accessed before the elapsed time from the sending of the first order notification exceeds the second predetermined time is an example of the "second notification condition".

(Fifth Variant) The "first communication method" may be the communication method in which the service application 138 installed in the terminal device 100 is identified as a destination, and the "second communication method" may be the communication method for sending the second order notification to the terminal device 100 by e-mail.

(Sixth Variant) In S212 of FIG. 7, the CPU 332 may determine whether the cartridge number in the target cartridge information matches the cartridge number in the consumable article information and also determine whether the current remaining amount is no greater than the previous remaining amount. In the present variant, the CPU 332 determines YES in S212 in a case of determining that the cartridge number in the target cartridge information matches the cartridge number in the consumable article information and the current remaining amount is equal to or less than the previous remaining amount. On the other hand, the CPU 332 determines NO in S212 in a case of determining that the cartridge number in the target cartridge information does not match the cartridge number in the consumable article information or in a case of determining that the current remaining amount is greater than the previous remaining amount.

(Seventh Variant) S150 to S158 of FIG. 6 and S240 to S244 of FIG. 7 may be omitted. In this variant, "determine whether the consumable article information includes predetermined information" and "send a third notification" may be omitted.

(Eighth Variant) A cartridge number of cartridge that is the target of the shipping service may be stored in the memory 334 of the shipping server 300 in advance. In this variant, the CPU 332 determines in S110 of FIG. 6 and S210 of FIG. 7 whether the cartridge number in the consumable article information matches the cartridge number of the cartridge that is the target of the shipping service stored in the memory 334. In this variant, the CPU 332 determines YES in S110 and S210 in a case where the cartridge number in the consumable article information matches the cartridge number of the target of the shipping service. On the other hand, the CPU 332 determines NO in S110 and S210 in a case where the consumable article information does not include cartridge information or in a case where the cartridge number in the consumable article information does not match the cartridge number of the target of the shipping service.

(Ninth Variant) In the embodiments above, the processes of FIGS. 3 to 11 are realized by software (e.g., the programs 36, 136, 236, 336), however, at least one of these processes may be realized by hardware such as a logic circuit.

What is claimed is:

1. A server comprising:
a controller configured to:
receive consumable article information including usage information from an external device, the usage information being information related to a current used amount of a consumable article that is currently attached to a printer for printing;
in a case where the consumable article information is received from the external device, determine by using the usage information included in the consumable article information whether a first notification condition is satisfied, the first notification condition being related to an order of a new consumable article;
in a case where it is determined that the first notification condition is satisfied, send by using a first communication method a first notification for prompting the order of the new consumable article to a first external;
after the first notification has been sent to the first external, determine whether a second notification condition is satisfied, the second notification condition corresponding to that the new consumable article has not been ordered in response to the sending of the first notification; and
in a case where it is determined that the second notification condition is satisfied, send by using a second communication method that is different from the first communication method a second notification for prompting the order of the new consumable article to a second external.

2. The server as in claim 1, wherein
the external device is a terminal device, and
in a case where the consumable article information is sent to the terminal device from the printer, the consumable article information is received from the terminal device.

3. The server as in claim 1, wherein
the usage information indicates a remaining amount of a coloring material which is the consumable article,
in a case where a first remaining amount indicated by the usage information is equal to or less than a threshold, it is determined that the first notification condition is satisfied, and
in a case where the first remaining amount is greater than the threshold, it is determined that the first notification condition is not satisfied.

4. The server as in claim 1, wherein
the first notification includes a Uniform Resource Locator (URL) to be accessed to order the new consumable article,
in a case where the URL has been accessed, it is determined that the second notification condition is satisfied, and
in a case where the URL has not been accessed, it is determined that the second notification condition is not satisfied.

5. The server as in claim 1, wherein
the first external is an e-mail address, and
the second external is a specific application program installed in the external device.

6. The server as in claim 1, wherein
the consumable article information includes the usage information and identification information for identifying the consumable article that is currently attached to the printer, and
the controller is configured to:
receive first consumable article information including first usage information and first identification information from the external device;
send the first notification to the first external in response to receiving the first consumable article information; and
receive second consumable article information including second usage information and second identification information from the external device after the first notification has been sent,
wherein the controller is further configured to:
in a case where the second consumable article information is received from the external device, determine whether the first identification information matches the second identification information,
wherein in a case where it is determined that the first identification information matches the second identification information and the second notification condition is satisfied, the second notification is sent to the second external.

7. The server as in claim 1, wherein
the usage information indicates a remaining amount of a coloring material which is the consumable article, and
the controller is configured to:
receive first consumable article information including first usage information from the external device;
send the first notification to the first external in response to receiving the first consumable article information from the external device; and
receive third consumable article information including third usage information from the external device,
wherein the controller is further configured to:
in a case where the third consumable article information is received from the external device, determine whether a third remaining amount indicated by the third usage information is not greater than a first remaining amount indicated by the first usage information,
wherein in a case where it is determined that the third remaining amount is not greater than the first remaining amount and the second notification condition is satisfied, the second notification is sent to the second external.

8. The server as in claim 1, wherein
the controller is further configured to:
in a case where the consumable article information is received from the external device, determine whether the consumable article information includes predetermined information, the predetermined information indicating that a service related to the order of the new consumable article is able to be received; and
in a case where it is determined that the consumable article information does not include the predetermined information, send a third notification to a third external, the third notification indicating that the service is unable to be received.

9. A non-transitory computer-readable recording medium storing computer-readable instructions for a server, wherein
the computer-readable instructions, when executed by a processor of the server, cause the server to:
receive consumable article information including usage information from an external device, the usage information being information related to a current used amount of a consumable article that is currently attached to a printer for printing;
in a case where the consumable article information is received from the external device, determine by using the usage information included in the consumable article information whether a first notification condition is satisfied, the first notification condition being related to an order of a new consumable article;
in a case where it is determined that the first notification condition is satisfied, send by using a first communication method a first notification for prompting the order of the new consumable article to a first external;
after the first notification has been sent to the first external, determine whether a second notification condition is satisfied, the second notification condition corresponding to that the new consumable article has not been ordered in response to the sending of the first notification; and
in a case where it is determined that the second notification condition is satisfied, send by using a second communication method that is different from the first communication method a second notification for prompting the order of the new consumable article to a second external.

10. The non-transitory computer-readable recording medium as in claim 9, wherein
the external device is a terminal device, and
in a case where the consumable article information is sent to the terminal device from the printer, the consumable article information is received from the terminal device.

11. The non-transitory computer-readable recording medium as in claim 9, wherein
the usage information indicates a remaining amount of a coloring material which is the consumable article,
in a case where a first remaining amount indicated by the usage information is equal to or less than a threshold, it is determined that the first notification condition is satisfied, and
in a case where the first remaining amount is greater than the threshold, it is determined that the first notification condition is not satisfied.

12. The non-transitory computer-readable recording medium as in claim 9, wherein
the first notification includes a Uniform Resource Locator (URL) to be accessed to order the new consumable article,
in a case where the URL has been accessed, it is determined that the second notification condition is satisfied, and
in a case where the URL has not been accessed, it is determined that the second notification condition is not satisfied.

13. The non-transitory computer-readable recording medium as in claim 9, wherein
the first communication method is a communication method for sending the first notification by e-mail, and
the second communication method is a communication method in which a specific application program installed in the external device is specified as destination.

14. The non-transitory computer-readable recording medium as in claim 9, wherein
the consumable article information includes the usage information and identification information for identifying the consumable article that is currently attached to the printer, and
the computer-readable instructions, when executed by the processor, cause the server to:
receive first consumable article information including first usage information and first identification information from the external device;
send the first notification to the first external in response to receiving the first consumable article information; and
receive second consumable article information including second usage information and second identification information from the external device after the first notification has been sent,
wherein the computer-readable instructions, when executed by the processor, further cause the server to:
in a case where the second consumable article information is received from the external device, determine whether the first identification information matches the second identification information,
wherein in a case where it is determined that the first identification information matches the second identification information and the second notification condition is satisfied, the second notification is sent to the second external.

15. The non-transitory computer-readable recording medium as in claim 9, wherein
the usage information indicates a remaining amount of a coloring material which is the consumable article, and
the computer-readable instructions, when executed by the processor, cause the server to:
receive first consumable article information including first usage information from the external device;
send the first notification to the first external in response to receiving the first consumable article information from the external device; and
receive third consumable article information including third usage information from the external device,
wherein the computer-readable instructions, when executed by the processor, further cause the server to:
in a case where the third consumable article information is received from the external device, determine whether a third remaining amount indicated by the third usage information is not greater than a first remaining amount indicated by the first usage information,
wherein in a case where it is determined that the third remaining amount is not greater than the first remaining amount and the second notification condition is satisfied, the second notification is sent to the second external.

16. The non-transitory computer-readable recording medium as in claim 9, wherein
the computer-readable instructions, when executed by the processor, further cause the server to:
in a case where the consumable article information is received from the external device, determine whether the consumable article information includes predetermined information, the predetermined information indicating that a service related to the order of the new consumable article is able to be received; and in a case where it is determined that the consumable article information does not include the predetermined information, send a third notification to a third external, the third notification indicating that the service is unable to be received.

17. A method executed by a server, the method comprising:

receiving consumable article information including usage information from an external device, the usage information being information related to a current used amount of a consumable article that is currently attached to a printer for printing;

in a case where the consumable article information is received from the external device, determining by using the usage information included in the consumable article information whether a first notification condition is satisfied, the first notification condition being related to an order of a new consumable article;

in a case where it is determined that the first notification condition is satisfied, sending by using a first communication method a first notification for prompting the order of the new consumable article to a first external;

after the first notification has been sent to the first external, determining whether a second notification condition is satisfied, the second notification condition corresponding to that the new consumable article has not been ordered in response to the sending of the first notification; and in a case where it is determined that the second notification condition is satisfied, sending by using a second communication method that is different from the first communication method a second notification for prompting the order of the new consumable article to a second external.

18. The method as in claim 17, wherein the external device is a terminal device, and in a case where the consumable article information is sent to the terminal device from the printer, the consumable article information is received from the terminal device.

19. The method as in claim 17, wherein the usage information indicates a remaining amount of a coloring material which is the consumable article, in a case where a first remaining amount indicated by the usage information is equal to or less than a threshold, it is determined that the first notification condition is satisfied, and in a case where the first remaining amount is greater than the threshold, it is determined that the first notification condition is not satisfied.

20. The method as in claim 17, wherein the first notification includes a Uniform Resource Locator (URL) to be accessed to order the new consumable article, in a case where the URL has been accessed, it is determined that the second notification condition is satisfied, and in a case where the URL has not been accessed, it is determined that the second notification condition is not satisfied.

* * * * *